(No Model.)

G. L. POTTER.
SPRING.

No. 470,949. Patented Mar. 15, 1892.

Witnesses:
Henry Drury
J. H. Russell

Inventor:
George L. Potter
by his atty.
Francis T. Chambers

UNITED STATES PATENT OFFICE.

GEORGE L. POTTER, OF FORT WAYNE, INDIANA.

SPRING.

SPECIFICATION forming part of Letters Patent No. 470,949, dated March 15, 1892.

Application filed December 9, 1891. Serial No. 414,503. (No model.)

*To all whom it may concern:*

Be it known that I, GEORGE L. POTTER, of Fort Wayne, county of Allen, and State of Indiana, have invented a certain new and Improved Spring, of which the following is a true and exact description, reference being had to the accompanying drawings, forming a part of this specification.

My invention relates to the construction of springs made up of a series of thin plates secured together at their center and of gradually-increasing length—such, for instance, as the well-known half-elliptic spring used in locomotive-engines. In use the weight is suspended on these springs through hanger-gibs, and to form a bearing for such gibs it is usual to weld a piece of iron to the ends of the longer spring-leaf. This usual construction I have found to be objectionable because the welding of iron plates to the spring-leaf weakens it on account of the nature of the steel being changed, due to the excessive heat necessary to make the weld, which sometimes results in the steel being burned, causing frequent breakages, and also because it destroys the elasticity of the ends of the spring, and because it is more expensive than by the method shown by my invention; and my invention consists in forming the longer leaf or plate with ends of much greater length than is required for the efficient part of the spring and bending such ends back against the plate, without welding, to form the gib-bearing. Preferably this inwardly-bent end is corrugated before being bent down against the plate.

Figure 1:
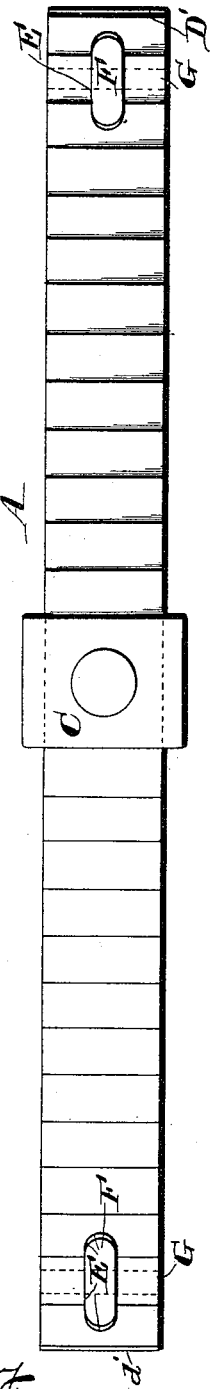
Figure 2:
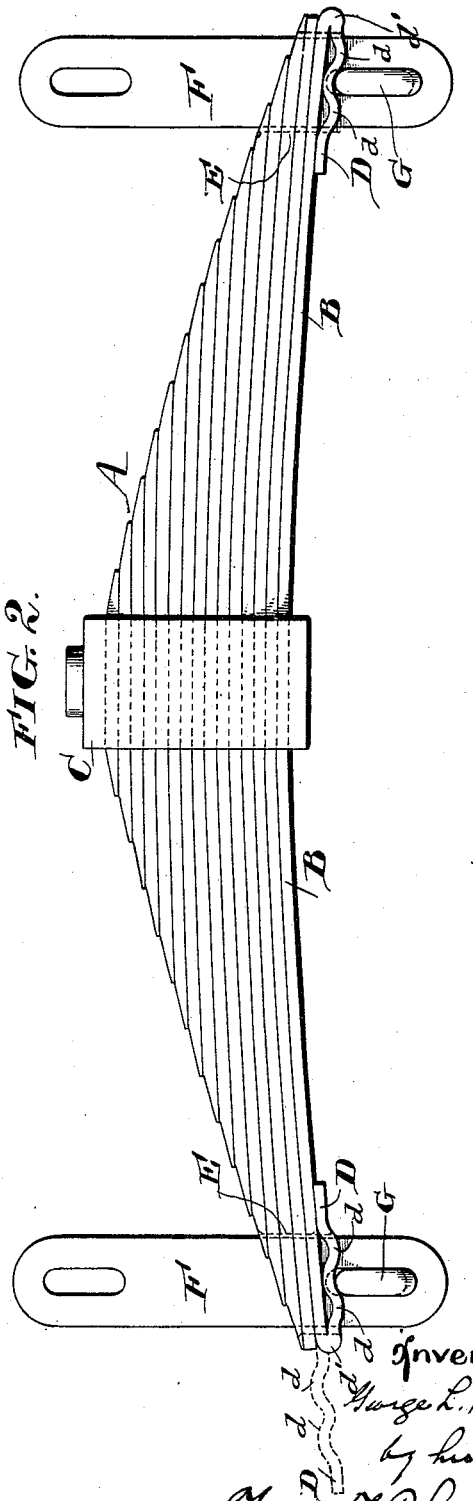

Reference now being had to the drawings which illustrate my invention, Figure 1 is a plan view of my spring, and Fig. 2 a side elevation thereof.

A is the spring, made up of series of plates of varying length, of which B is the longest, C being a clamp holding the leaves together.

D is the prolonged end of plate B, which is preferably corrugated, as shown at $d\ d$, and is bent back against the plate B at $d'$. The bending can be and is effected at a heat which will not injure the strength and elasticity of leaf B, and the end simply rests against it without forming a welded union.

E indicates a slot formed throughout the ends of spring A and passing through the bent end D of leaf B, and throughout this slot the hanger F passes, the gib G resting against D at H, as shown.

Having now described my invention, what I claim as new, and desire to secure by Letters Patent, is—

1. In a spring consisting of a series of plates of varying length secured together as described, a hanger-gib bearing formed by bending the end of the longer plate back upon itself without welding.

2. In a spring consisting of a series of plates of varying length secured together, as described, a hanger-gib bearing formed by corrugating an extension of the longer plate and bending it back upon said plate without welding it thereto.

GEORGE L. POTTER.

Witnesses:
F. R. WELDON,
JAMES S. GORDON.